(12) United States Patent
Sternberger et al.

(10) Patent No.: US 6,622,474 B1
(45) Date of Patent: Sep. 23, 2003

(54) SYNCHRONIZATION CROSS-FEED SYSTEM

(75) Inventors: Joe E. Sternberger, Wichita, KS (US); Gregory S. Hills, Derby, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/943,795

(22) Filed: Aug. 31, 2001

(51) Int. Cl.[7] .............................................. F02K 3/02
(52) U.S. Cl. ...................................................... 60/226.2
(58) Field of Search .............................. 60/226.2, 204; 244/110 B; 239/265.37

(56) References Cited

U.S. PATENT DOCUMENTS

| | | | |
|---|---|---|---|
| 3,715,079 A | * | 2/1973 | Thompson ............. 239/265.17 |
| 4,391,409 A | | 7/1983 | Scholz |
| 5,280,704 A | | 1/1994 | Anderson et al. |
| 5,448,884 A | * | 9/1995 | Repp ........................... 60/223 |
| 5,609,020 A | | 3/1997 | Jackson et al. |
| 5,960,626 A | | 10/1999 | Baudu et al. |
| 6,042,053 A | | 3/2000 | Sternberger et al. |
| 6,094,908 A | * | 8/2000 | Baudu et al. ............... 60/226.2 |
| 6,138,449 A | | 10/2000 | Hudson |

* cited by examiner

*Primary Examiner*—Ehud Gartenberg
(74) *Attorney, Agent, or Firm*—Harness Dickey & Pierce P.L.C.

(57) ABSTRACT

A synchronization cross-feed system for a thrust reverser having at least first and second sides. Each side of the thrust reverser has a thrust reverser actuation system having a plurality of actuators. The actuators in each thrust reverser actuation system are synchronized by a synchronization system. A synchronization cross-feed system couples the synchronization systems of the thrust reverser actuation system of the first and second sides of the thrust reverser allowing an anti-deployment mechanisms of each thrust reverser actuation system to serve as one or more of the redundant anti-deployment mechanism for other the thrust reverser actuation system.

18 Claims, 9 Drawing Sheets

SYNCHRONIZATION CROSS-FEED SYSTEM

FIELD OF THE INVENTION

The present invention relates to thrust reversers for jet engines, and more particularly, to anti-deployment mechanisms for thrust reversers.

BACKGROUND OF THE INVENTION

Jet aircraft, such as commercial passenger and military aircraft, utilize thrust reversers on the aircraft's jet engines to reduce the aircraft's speed after landing. One type of thrust reverser used in modern jet aircraft is the cascade type, described in more detail in U.S. Pat. No. 5,448,884. For ease of reference, the description of the cascade type of thrust reverser is substantially reproduced herein.

Figure 1:
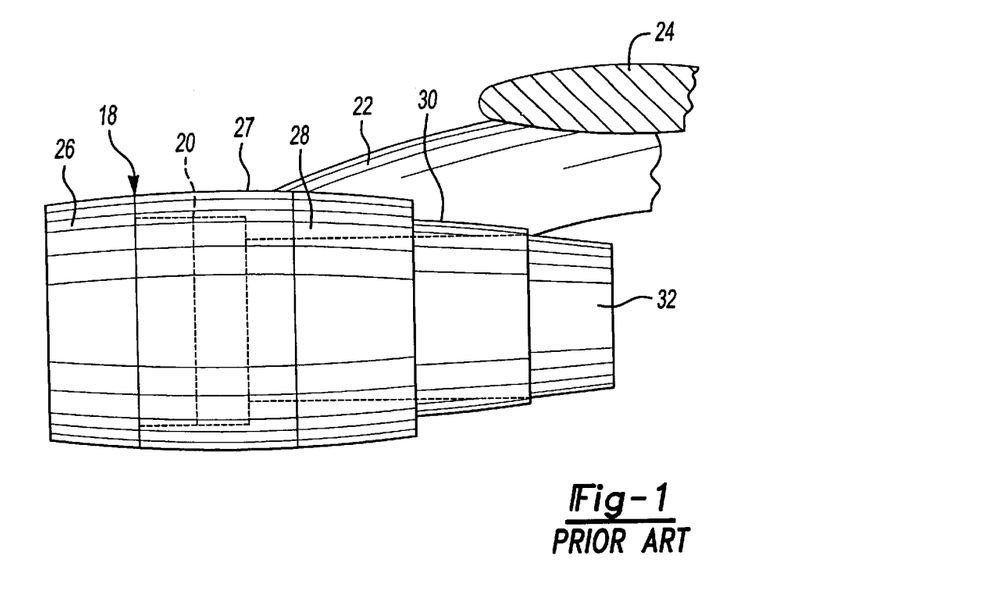
FIG. 1 is a side view of a conventional nacelle and strut.

Referring first to FIG. 1, there is shown a conventional aircraft nacelle indicated at 18 which includes a jet engine, such as a Pratt & Whitney PW4000, indicated at 20 (shown in hidden lines) supported by a strut 22 on a wing 24 (only a portion of which is shown). The nacelle 18 includes a nose cowl 26, a fan cowl 27, a thrust reverser sleeve 28, a core cowl 30 and nozzle exhaust 32. Although some of these components are made up of two mirror image parts split vertically in a clamshell arrangement, each component will be referred to herein as being one piece.

Figure 2:
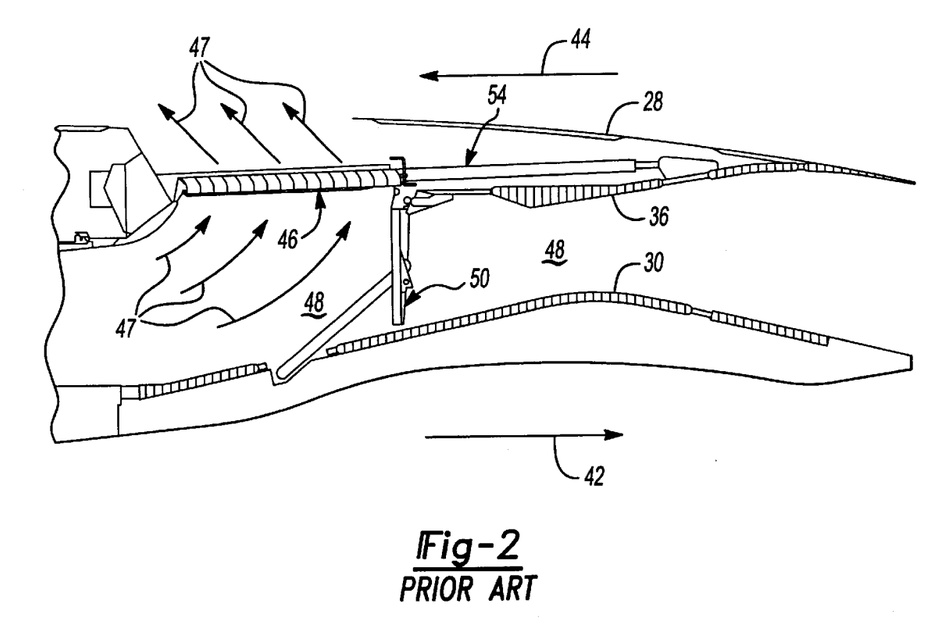
FIG. 2 is a side view of a conventional thrust reverser system.
Figure 3:
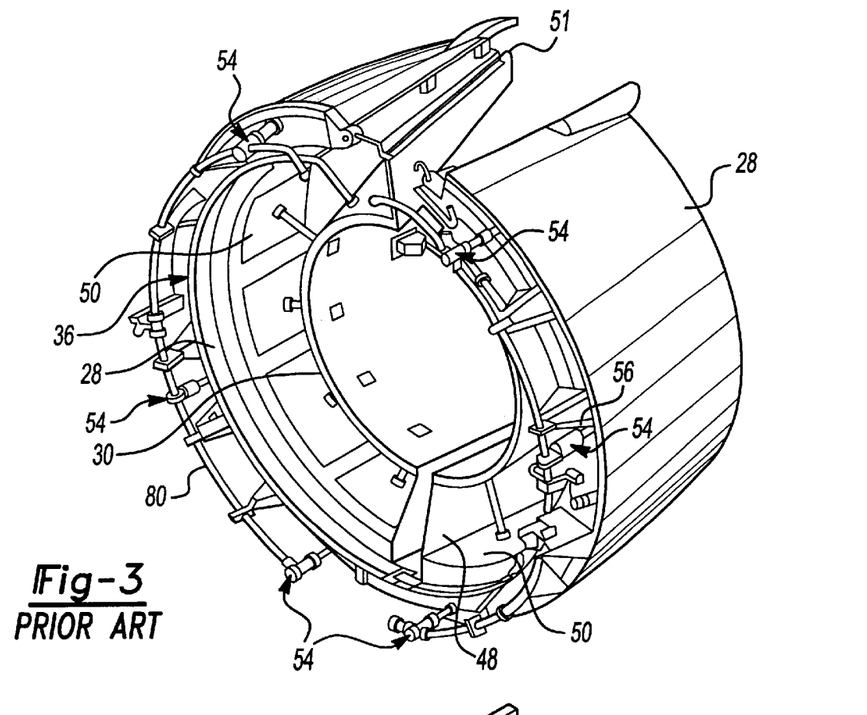
FIG. 3 is an isometric view of a conventional thrust reverser system.

As shown in more detail in FIGS. 2 and 3, the thrust reverser system includes an inner duct (fan duct cowl) 36 and outer sleeve 28. The sleeve 28 translates in an aft direction indicated by an arrow identified by a number 42 in FIG. 2, and a forward direction indicated by an arrow identified by a number 44. When the thrust reverser is deployed, the translating sleeve 28 moves aft from a "stowed" position shown in FIG. 1 to a "deployed" position shown in FIG. 2. In this process, cascade vanes 46 (FIG. 2) mounted to a thrust reverser support structure are uncovered. Vanes 46 are slanted in a forward direction so that during thrust reverser operation, fan air from the engine is redirected forward through the vanes (indicated by arrows 47) to aid in decelerating the airplane.

Air driven aft by the engine fan flows along an annular duct 48 (FIGS. 2 & 3) formed by the fan duct cowl 36 and core duct cowl 30. Movement of the sleeve 28 in the aft direction, causes blocker doors 50 to pivot from their stowed positions (shown in FIG. 3) to their deployed positions (shown in FIG. 2) where the doors are positioned to block rearward movement of the air through duct 48. In this manner all rearward movement of the engine fan air is redirected forward through the cascade vanes 46.

Figure 4:
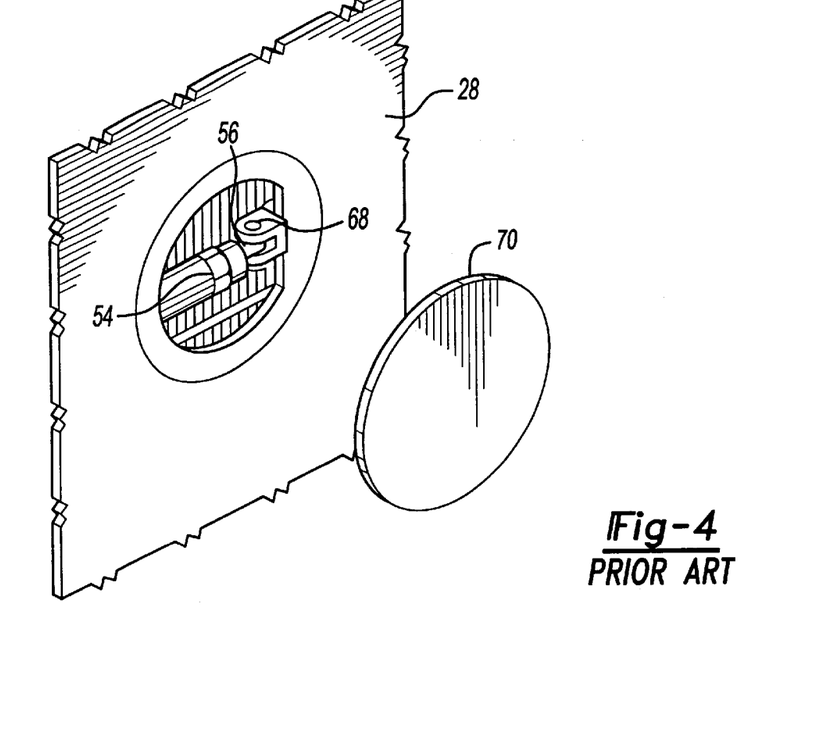
FIG. 4 is a partial view of a conventional thrust reverser sleeve showing an access port located on the sleeve.
Figure 5:
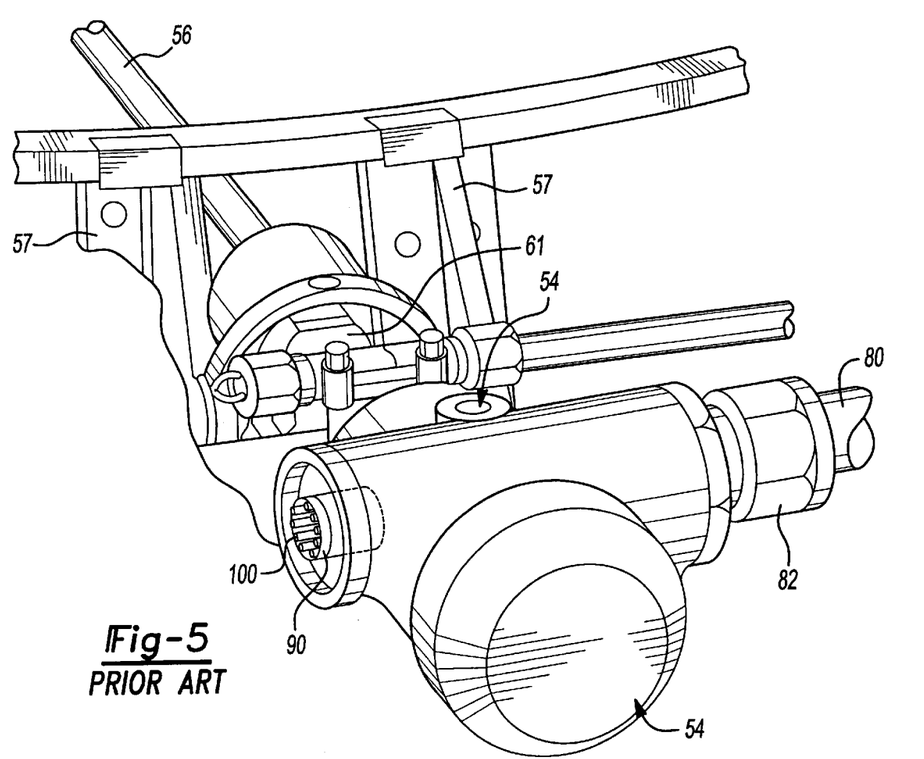
FIG. 5 is an isometric view of a conventional thrust reverser actuator.
Figure 6:
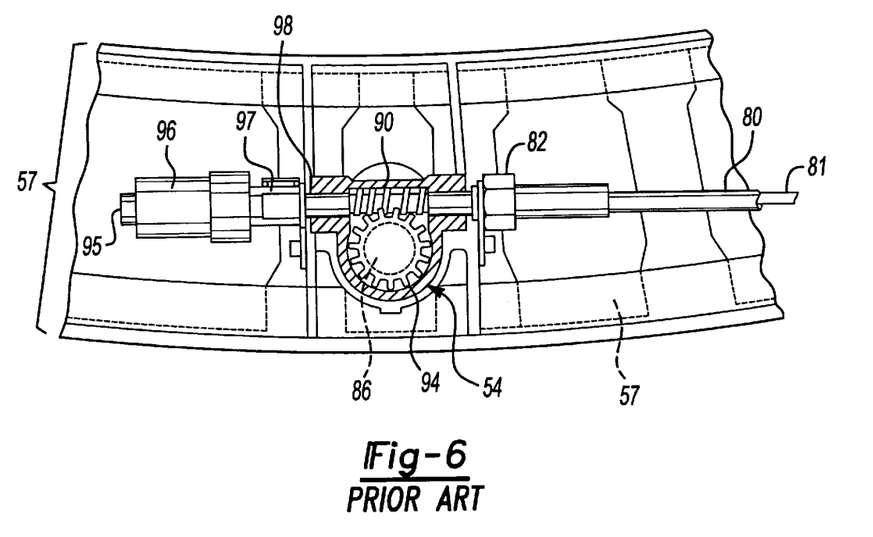
FIG. 6 is a side view of the conventional thrust reverser actuator shown in FIG. 5.

Movement of the sleeve 28 is guided along a pair of parallel tracks mounted to the top and bottom of the fan duct cowl 36 in a fore and aft direction. The sleeve 28 is moved between the stowed and deployed positions by means of a number of hydraulic actuators indicated at 54 (FIG. 3), each having an actuator rod 56 which is connected to the sleeve 28. More specifically, as shown in FIGS. 5 and 6, each actuator 54 is connected to a structural torque box 57 via a gimbal mount 61 thereby allowing the actuator to accommodate lateral variances in sleeve motion. As shown in FIG. 4, the actuator rod 56 is located inside the aerodynamic surface of sleeve 28 and is connected to the sleeve 28 by a ball joint 68. The ball joint 68 is accessible by removing a panel 70 which is bolted to the exterior surface of the sleeve 28.

In operation, when the thrust reverser is commanded by the pilot to the deployed position, each actuator rod 56 (FIG. 5) extends in the aft direction. Conversely, when the thrust reverser is commanded by the pilot to move to the stowed position, each actuator rod 56 retracts in the forward direction. In an exemplary embodiment, the actuator 54 is a thrust reverser actuator currently installed on Boeing 767 airplanes.

Figure 7:
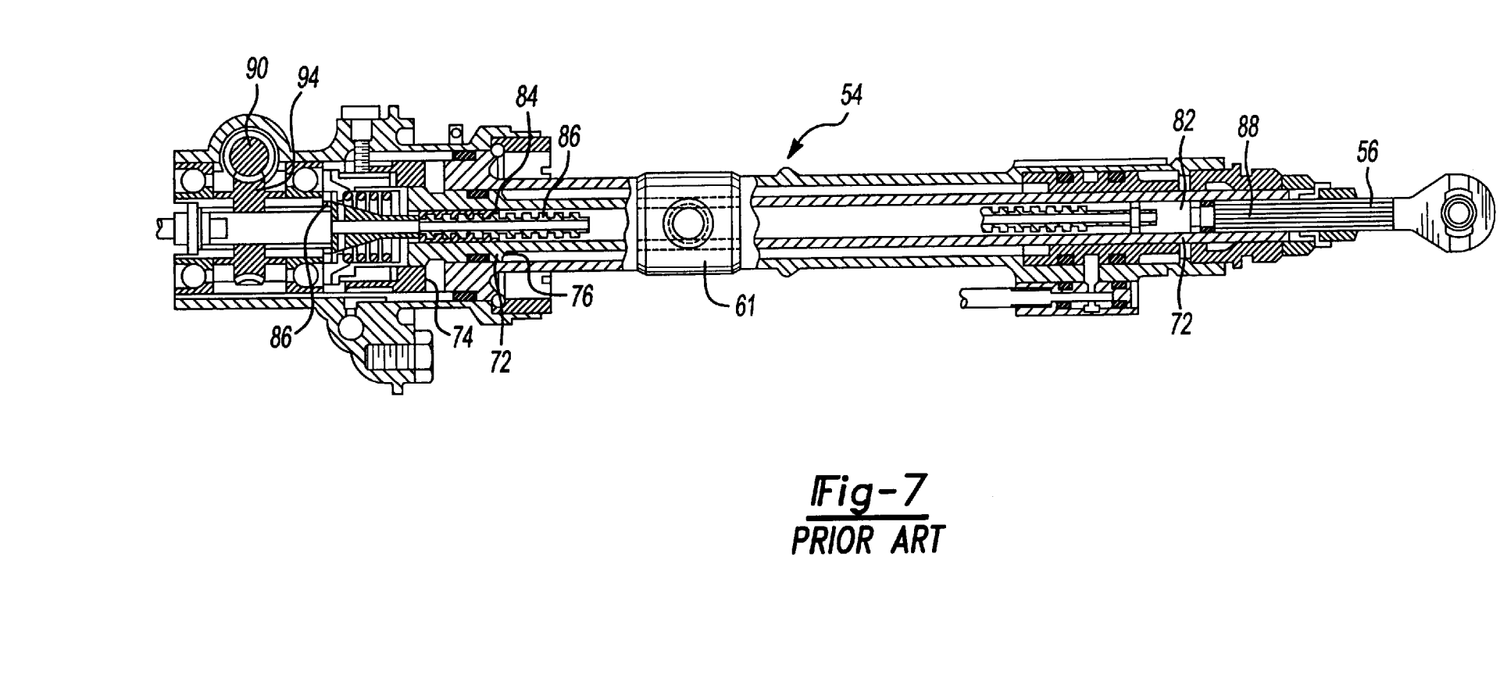
FIG. 7 is side sectional view of the thrust reverser actuator shown in FIGS. 5 and 6.
Figure 8:
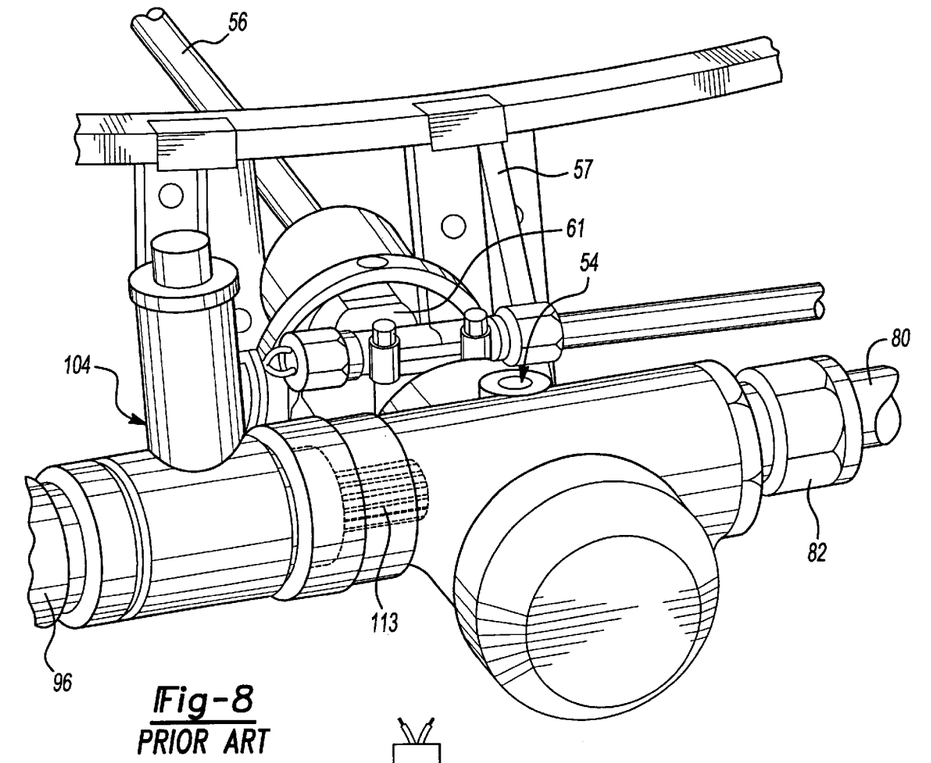
FIG. 8 is an isometric view of a thrust reverser actuator employing a prior-art mechanical synchronization shaft lock.
Figure 9:
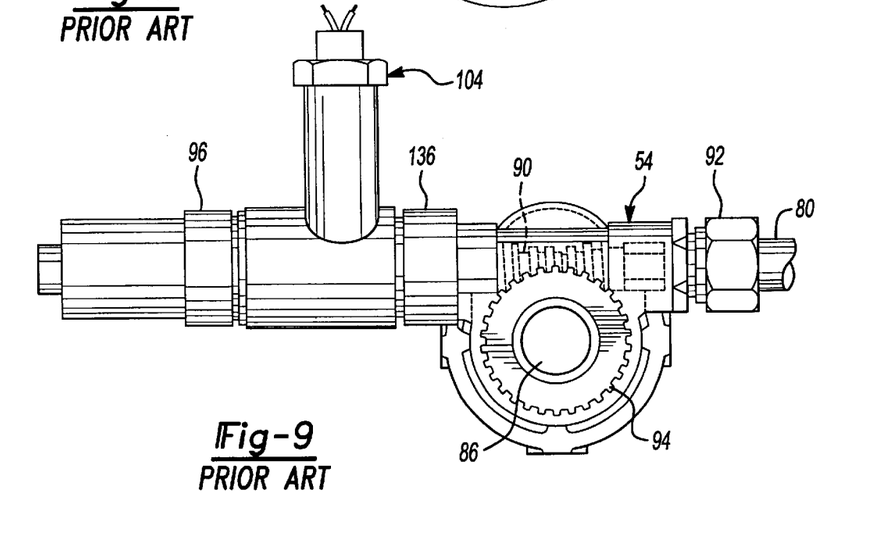
FIG. 9 is a side view of the thrust reverser actuator and mechanical lock shown in FIG. 8.

As shown in FIG. 7, each actuator 54 includes a double acting piston 72 which is extended in the rightward direction (with reference to FIG. 7) by hydraulic pressure acting against a face 74 of the piston 72. Retraction of the piston 72 and the thrust reverser sleeve therewith is accomplished by relieving hydraulic pressure from the piston face 74, so that hydraulic pressure acting against an opposing face 76 of the piston causes it to move in the leftward direction. The piston 72 is connected to the actuator rod 56 which in turn is connected to the thrust reverser sleeve 28 in the manner described previously.

In the exemplary embodiment, each thrust reverser sleeve is driven by three of the actuators 54 (FIG. 3). It is important that each actuator 54 extend and retract the sleeve at the same rate to avoid causing the sleeve to bind along the tracks 51. To accomplish this, operation of each of the three actuators 54 is synchronized by means of an interconnecting synchronizing shaft 80. The sync shaft 80 (FIGS. 5 and 6) is a tube having a stationary outer sleeve and an internal rotating flexible shaft 81 which synchronizes motion of the three actuators. The outer sleeve of the sync shaft 80 is connected to the actuator 54 by a swivel coupling 82.

In order to explain this synchronizing operation in greater detail, reference is made to the section view of the actuator 54 in FIG. 7. As shown, the piston 72 is connected via a non-rotating threaded drive nut 84 to a rotating Acme screw 86. As piston 72 translates the drive nut 84 moves with it. Translating movement of the drive nut 84 along the Acme screw 86 causes the Acme screw to rotate thereby converting translational movement into rotational movement. Synchronizing operation is further accomplished by a worm gear 90 (FIG. 6) located inside the actuator housing which engages a spur gear 94 which in turn is mounted to the end of the Acme screw 86. Furthermore, the internal sync shaft 81 has a splined end tip which is positioned inside a slot (not shown) in the right end of the worm gear 90.

Referring again to FIG. 7, extension and retraction of the thrust reverser sleeve results in rotation of the Acme screw 86 and rotary gear 94 therewith. This causes rotation of the worm gear 90 in a manner that a high torque and low rotational speed input from the Acme screw 86 is converted by the worm gear 90 to a low torque and high rotational speed output to the sync shaft. In the event one of the actuators 54 attempts to move the thrust reverser sleeve at a different rate than the other actuators, their rates are equalized via the common sync shaft and through the respective worm gears, spur gears and Acme screws of the actuators. This results in uniform translation of the thrust reverser sleeve.

In order to allow the thrust reverser sleeve 28 to be moved between the stowed and deployed positions for maintenance purposes while the airplane is on the ground, a manual drive clutch mechanism 96 shown in FIG. 6 is attached to the left end of the actuator. The manual drive clutch 96 includes a socket (not shown) for receiving a square drive tool (also not shown) in its left end 95. The manual drive clutch 96 is connected by a female coupling 97 to a threaded male connector 98 at the left end of the actuator. The drive clutch 96 includes a drive shaft 99 (FIG. 10) having a square-ended tip which extends in a rightward direction from the clutch and which fits inside an end slot 100 (FIG. 5) of the actuator worm gear 90.

In operation, when the square drive tool is inserted into the manual drive clutch in a rightward direction, the clutch is engaged thereby allowing the square drive tool to drive the worm gear 90 (FIG. 6), which in turn drives the spur gear 94, Acme screw 86 to translate the thrust reverser sleeve.

With reference to FIGS. 8–11, mechanical lock 104 is connected to the actuator 54 in place of the drive clutch 96. In turn, the drive clutch 96 is connected to the left end of the mechanical lock 104. Like elements described previously will be identified in FIGS. 8 through 11 by like numerals.

The purpose of the mechanical lock 104 is to prevent uncommanded translation of the thrust reverser sleeve. The mechanical lock 104 includes a cylindrical housing 106 (FIG. 10) having an internal cylindrical passageway 108. Axially aligned with the centerline of the passageway 108 is a cylindrical shaft 110 having an eight-pointed splined slot 112 at its left end for receiving therein the splined end tip 99 of the clutch mechanism 96 described previously. At the right end of the shaft 110 is a splined tip 113 which is inserted in the socket 100 (FIG. 5) of the actuator worm gear 90. Mounted centrally on the center shaft 110 (FIGS. 9 and 10) is a lock wheel 114 having a cylindrical outer surface 116.

Figure 10:
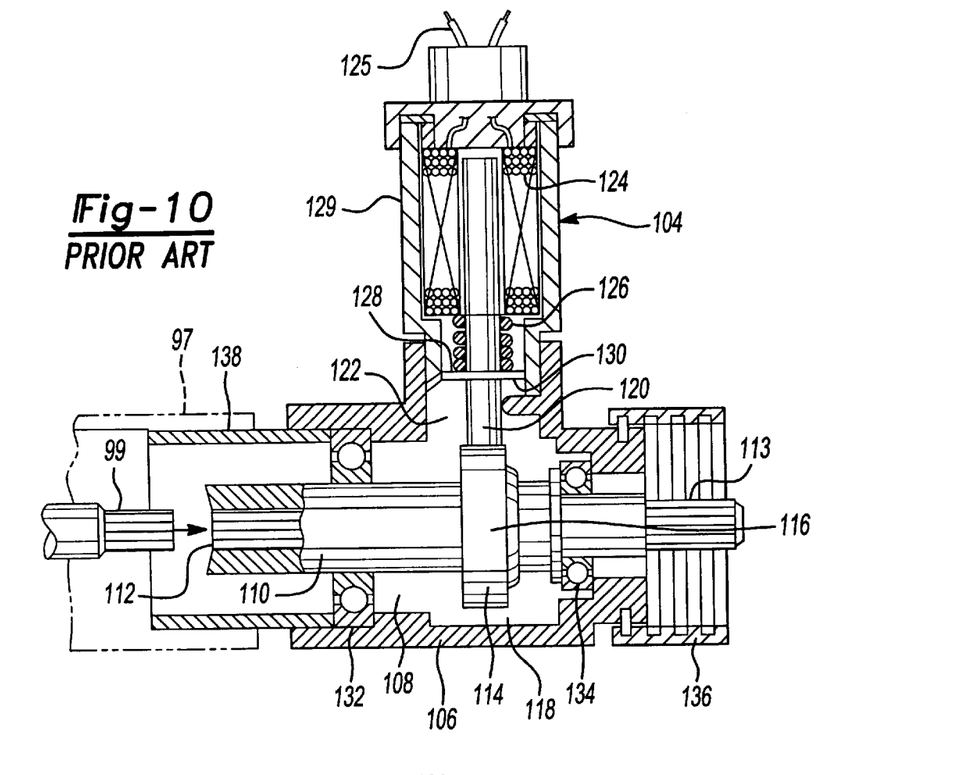
FIG. 10 is a side sectional view of the mechanical lock of FIG. 8.
Figure 11:
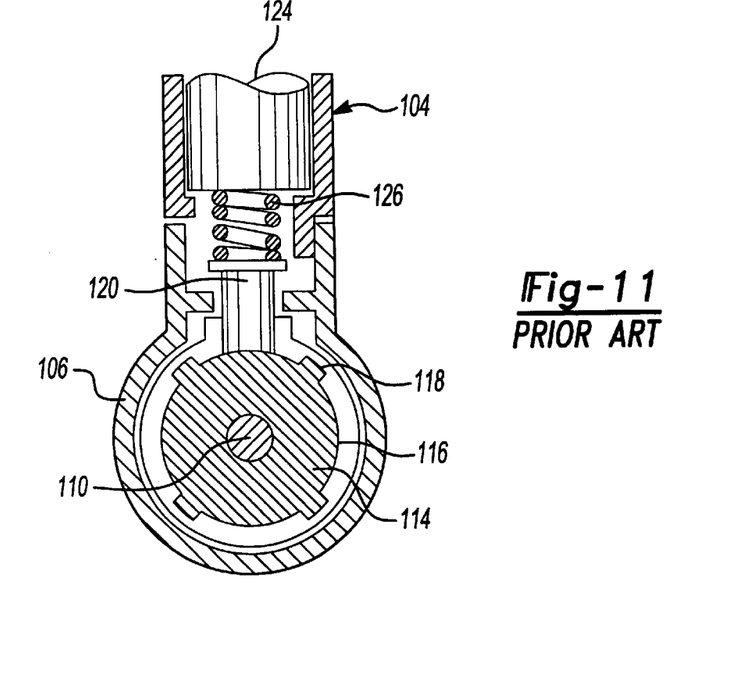
FIG. 11 is a partial end sectional view of the mechanical lock of FIG. 8.
Figure 12:
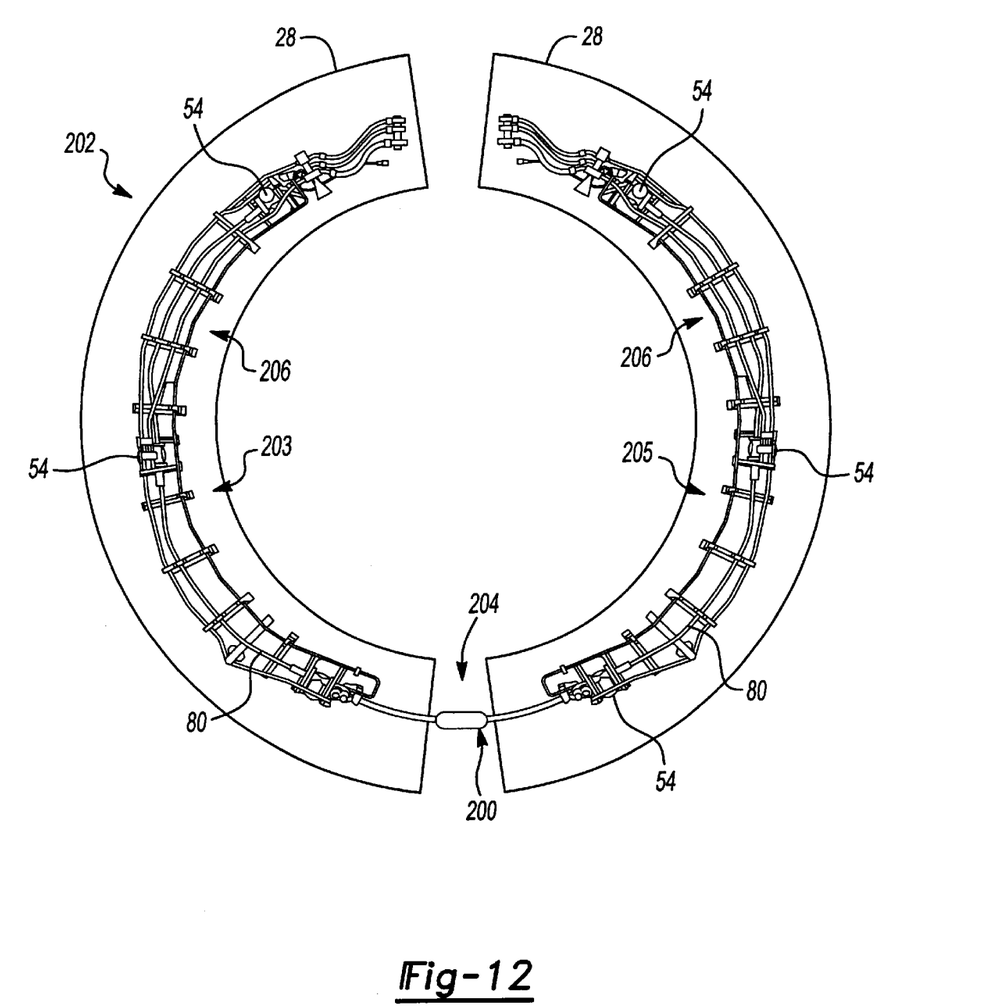
FIG. 12 is a cross-section of a thrust reverser having the synchronization cross-feed system of the invention.
Figures 13, 14, 15:
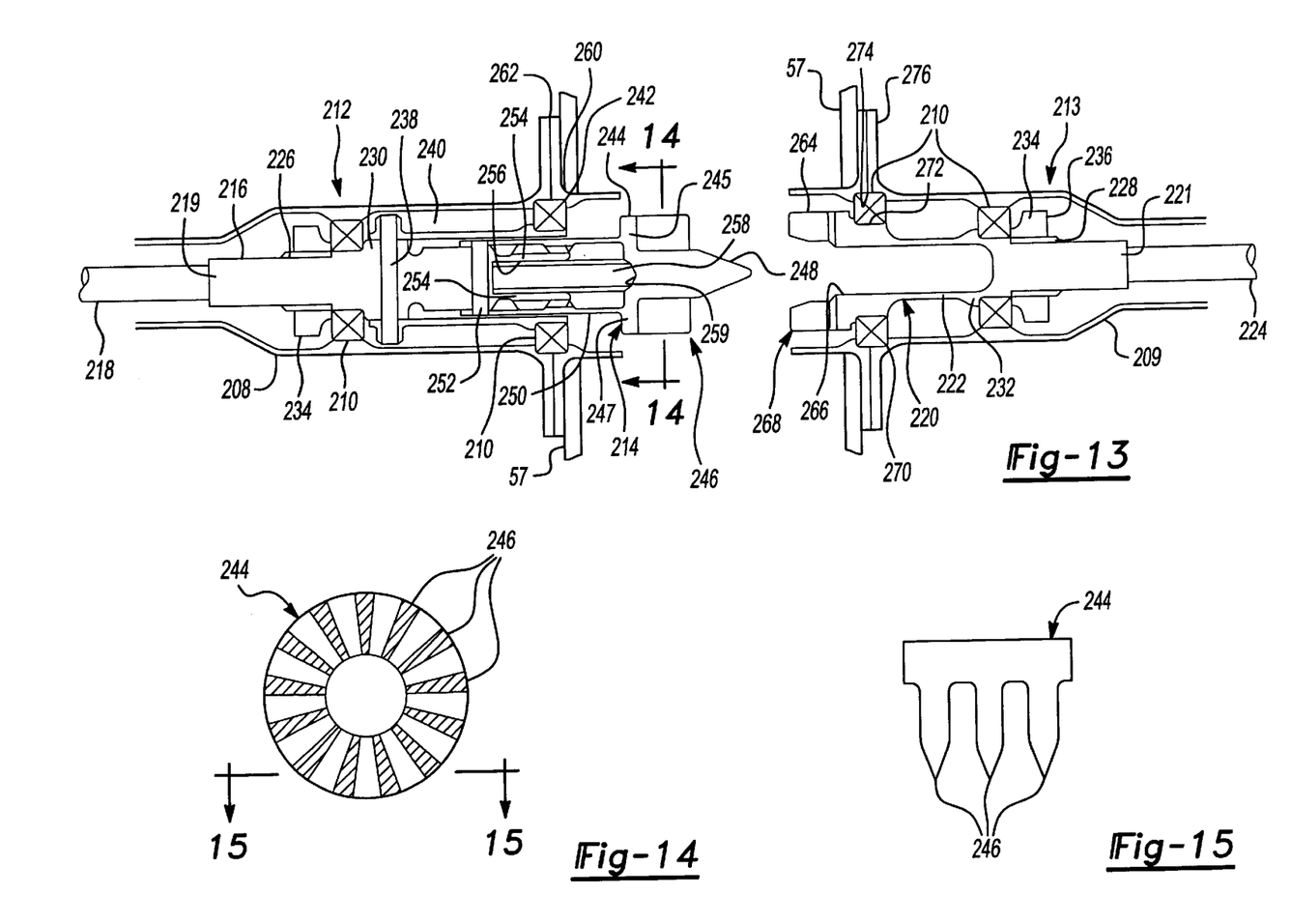
FIG. 13 is a side view of the synchronization cross-feed system of the invention in an open position.
FIG. 14 is a sectional view taken along the line 14—14 of FIG. 13.
FIG. 15 is a sectional view taken along the line 15—15 of FIG. 14.

Extending from the locking wheel surface 116 at equally spaced intervals are four square teeth 118 (FIG. 11) whose rotational path is blocked by a locking pin 120 when the device is de-energized and the locking pin is in a down/locking position shown in FIGS. 10 and 11. More particularly, the locking pin 120 extends through an opening 122 in the upper wall of the housing 106. It should be appreciated that the direction of the shear force created by the rotation of the locking wheel 114 and shaft 110 therewith is orthogonal to the locking/unlocking movement of the locking pin thereby minimizing the forces required to extend and retract the locking pin 120.

In operation, when the locking pin 120 is in the down/locking position it prevents rotational movement of the shaft 110 thereby preventing rotation of the worm 90 (FIG. 9), worm gear 94, and the Acme screw 86. This, in turn, prevents translational movement of the drive nut 84 (FIG. 7), the piston 72 and the thrust reverser sleeve 28 therewith, thereby preventing thrust reverser sleeve motion.

Movement of the locking pin 120 (FIG. 10) between the locked position and an unlocked position (where the pin 120 is above and clear of the teeth 118) is controlled by an electrically operated solenoid 124 through which the upper end of the locking pin 120 extends. Electrical control is initiated at the cockpit (not shown) via conventional airplane thrust reverser control circuits and is transmitted by electrical wires 125 to the solenoid 124. Control of the solenoid may be accomplished in a conventional manner. It should be appreciated that other means for controlling movement of the locking pin 120, such as hydraulic or electrohydraulic means, may be utilized.

Thrust reversers include various anti-deployment mechanisms to prevent in-flight deployment, such as locking actuators, non-locking actuators, synchronization shaft locks (sync lock), and auto-restow systems. Thrust reversers presently used on Boeing aircraft have three levels of locking means. For example, thrust reversers used on wide body aircraft illustratively have two locking actuators per nacelle and one sync lock per nacelle. Thrust reversers used on narrow body aircraft illustratively have one locking actuator per nacelle, one sync lock per nacelle, and an auto-restow system per nacelle.

It is an object of this invention to link the synchronization systems of the thrust reverser actuation systems of the two sides of the thrust reverser so that anti-deployment mechanisms used for each of the thrust reverser actuation systems can provide one or more of the redundant anti-deployment mechanisms for the other thrust reverser actuation system.

SUMMARY OF THE INVENTION

A synchronization cross-feed system for a thrust reverser having at least first and second sides. Each side of the thrust reverser has a thrust reverser actuation system having a plurality of actuators. The actuators in each thrust reverser actuation system are synchronized by a synchronization system. A synchronization cross-feed system couples the synchronization systems of the thrust reverser actuation systems of the first and second sides of the thrust reverser allowing an anti-deployment mechanisms of each thrust reverser actuation system to serve as one or more of the redundant anti-deployment mechanisms for other the thrust reverser actuation system.

In an embodiment, the synchronization cross-feed systems has first and second coupling assemblies that are removably coupled to each other so that they decouple from each other when the thrust reverser sides are opened to allow the thrust reverser sides to be opened.

In an embodiment, the first and second coupling assemblies have engagement teeth that mate with each other when the thrust reverser sides are closed.

In an embodiment, the engagement teeth of the first coupling assembly is disposed on a telescopic coupling shaft that is spring loaded by a spring in the first coupling assembly that forces telescopic coupling shaft toward the second coupling assembly.

In an embodiment, the first and second coupling assemblies have shafts that are coupled to respective actuators of the thrust reverser actuation systems of the first and second thrust reverser sides.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses;

Referring to FIGS. 12–16, a synchronization cross-feed system 200 in accordance with the invention is described. Elements common to FIGS. 1–11 will be identified with the same reference numerals. Specifically referring to FIG. 12, a cross-section of a thrust reverser 202, looking aft, is shown with synchronization cross-feed system 200 spanning a lower bifurcation area 204 of thrust reverser 202 and linking thrust reverser actuation systems 206 of left and right sides 203, 205, (as oriented in FIG. 12) of thrust reverser 202. Each thrust reverser actuation system 206 can illustratively be the thrust reverser actuation system described with reference to FIGS. 1–11.

Specifically referring to FIGS. 13–16, synchronization cross-feed system 200 is shown in greater detail. Synchronization cross-feed system 200 has left and right coupling assemblies 212, 213 (as oriented in FIGS. 13–16) having housings 208, 209 supporting respective bearing assemblies 210. Left coupling assembly 212 has a telescopic coupling shaft 214 slidably coupled to a synchronization shaft coupling 216 affixed to an end of a synchronization shaft 218. Right coupling assembly 213 has a fixed coupling 220 coupled to an end of a synchronization shaft 224. Synchronization shaft coupling 216 and fixed coupling 220 are generally cylindrical, having bores in distal ends 219, 221 which respective ends of synchronization shafts 218, 224 are received. Distal ends 219 and 221 are machined as double square ends and the ends of synchronization shafts 218, 224 that are received in the double square machined ends 219, 221 are illustratively swaged into squares. It should be understood that right coupling assembly 213 could have the telescopic coupling shaft 214 and the left coupling assembly 212 could have the fixed coupling 220.

Synchronization shaft coupling 216 and fixed coupling 220 illustratively include a threaded portion 226, 228, respectively, and shoulders 230, 232, respectively. A threaded bearing retainer 234 is threaded onto threaded portion 226 of synchronization shaft coupling 216 to retain bearing 236 of the bearing assembly 210 on left coupling assembly 212 against shoulder 230 to retain bearing 236 in place. Similarly, a second bearing retainer 234 is threaded onto threaded portion 228 of fixed coupling 220 retain bearing 236 of bearing assembly 210 on right coupling assembly 213 in place.

Left coupling assembly 212 further includes a pin 238 radially extending through synchronization shaft coupling 216 that holds a bearing retainer 240 in place. Bearing retainer 240 holds bearing 242 of bearing assembly 210 in left coupling assembly 212 in place.

Telescopic coupling shaft 214 includes wheel 244 having engagement teeth 246 extending radially outwardly around a proximal facing side 245 and extending axially therefrom toward fixed coupling 220. Wheel 244 also has tapered engagement nose 248 extending axially from the center of proximal facing side 245 toward fixed coupling 220. Wheel 244 and engagement teeth 246 are shown in more detail in FIG. 14. Wheel 244 further includes a cylindrical shaft 250 that extends from a distal facing side 247 of wheel 244 over synchronization shaft coupling 216 and is slidably secured thereon by a pin 252. A proximal end 254 of synchronization shaft coupling 216 has a spring receiving bore 256 therein that receives a spring 258 that extends within cylindrical shaft 250 of telescopic coupling shaft 214 to a spring receiving recess 259 in distal facing side 247 of wheel 244. Housing 208 of left coupling assembly 212 has a radially outwardly extending flange 262 at a proximal end 260. Flange 262 is secured to a fixed element of the thrust reverser, such as a torque box 57 of the left side of thrust reverser 202, to secure left coupling assembly 212 in place.

Figure 16:
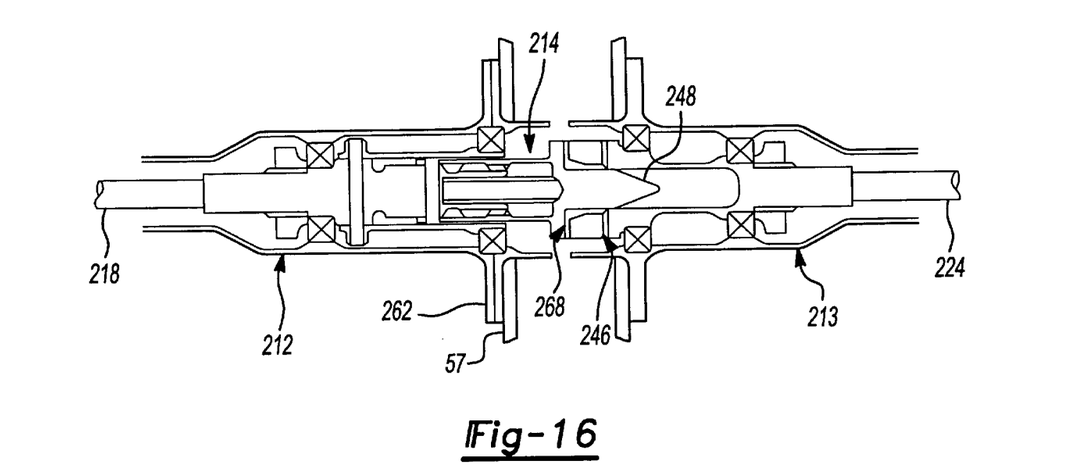
FIG. 16 is a side view of the synchronization cross-feed system of the invention in a closed position.

Fixed coupling 220 has a bore 266 therein that opens at a proximal end 264 of fixed coupling 220. Proximal end 264 has engagement teeth 268 around the opening of bore 266. Engagement teeth 268 extend axially toward telescopic coupling shaft 214. Engagement teeth 268 preferably angle outwardly from bore 266 to facilitate reception of tapered nose 248 into bore 266 when synchronization cross-feed system 200 is in its engaged position where coupling assembly 212 mates with right coupling assembly 213, as shown in FIG. 16. A bearing 270 of bearing assembly 210 of right coupling assembly 213 is disposed around fixed coupling 220 in a recess 272 therein and is received in a recess 274 in housing 209. Housing 209 includes a flange 276 secured to fixed element of thrust reverser 202, such as a torque box 57 of the right side of the thrust reverser 202, to secure right coupling assembly 213 in place.

In operation, left coupling assembly 212 mates with right coupling assembly 213 when thrust reverser sleeves 28 are in their operational positions (stowed or deployed). In this regard, the right and left sides of thrust reverser 202 are in proximity to each other such that telescopic coupling shaft 214 has been urged into fixed coupling 220 such that engagement teeth 246 of left coupling assembly 212 engage engagement teeth 268 of right coupling assembly 213. Cylindrical shaft 250 of telescopic coupling shaft 214 is urged into synchronization shaft coupling 216, compressing spring 262, which urges telescopic coupling shaft 214 into fixed coupling 220. Telescopic coupling shaft 214 in cooperation with spring 262 allows for some movement between the halves of thrust reverser 202 without damaging synchronization cross-feed system 200 yet maintains the engagement of coupling assemblies 212 and 213. Further, since coupling assemblies 212 and 213 are held together only by the force of spring 262, they decouple from each other when the left and right sides 203,205 of thrust reverser 202 are opened for maintenance, thus allowing the left and right sides 203, 205 of thrust reverser 202 to be opened for maintenance.

Synchronization shafts 218, 224 are coupled to translation actuators 54 of left and right sides of thrust reverser 202 in the same fashion as described above with reference to synchronization shaft 80 and translation actuators 54 and illustratively couples to a translation actuator 54 in lieu of manual drive clutch mechanism 96, thus coupling to the synchronization system (synchronization shaft 80 and associated components) of the thrust reverser actuation system. In this regard, a manual drive mechanism, such as manual drive mechanism 300 (FIG. 17), would be added to thrust reverser 202 in place of manual drive clutch mechanism 96. Alternatively, manual drive clutch mechanism 96 would be appropriately modified to permit the respective synchronization shaft 218, 224 to couple to the translation actuator 54. In another embodiment, mechanical lock 104 would be appropriately modified to permit the respective synchronization shafts 218, 224 to mate to mechanical lock 104 and thus to the synchronization system of the thrust reverser actuation system.

Figure 17:
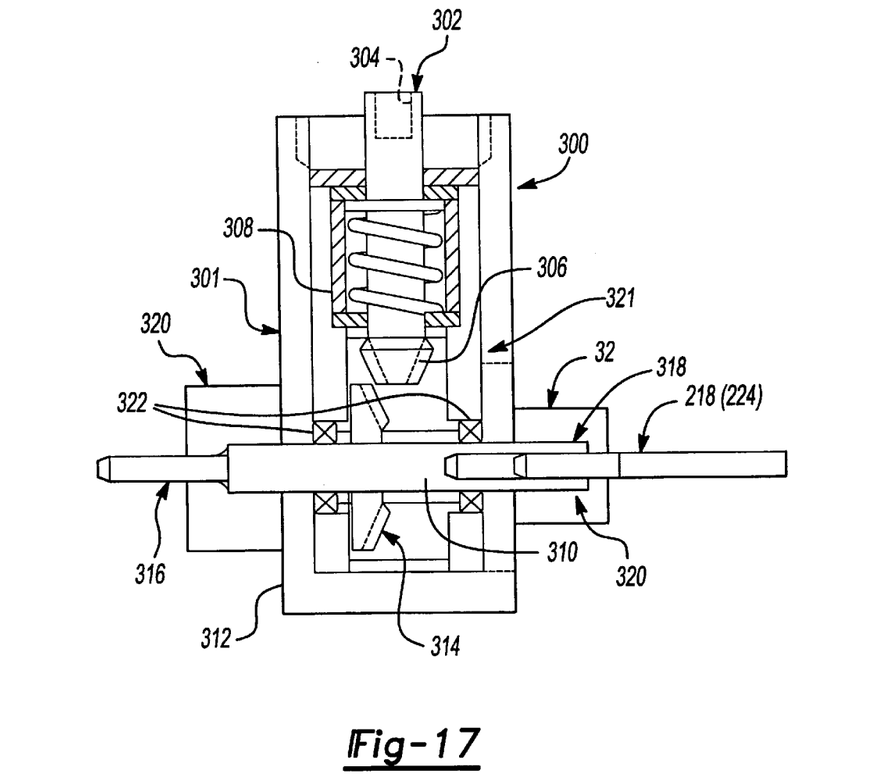
FIG. 17 is a side view of a ninety degree mechanical drive mechanism.

With reference to FIG. 17, mechanical drive mechanism 300 has a housing 301 in which a spring loaded drive pin 302 is mounted. Drive pin 302 has a square hole 304 in its top to receive a square driver. Drive pin 302 has a bevel gear 306 at a lower end 308 (as oriented in FIG. 17). A shaft 310 extends transversely through housing 301 at a lower end 312 thereof. Shaft 310 has a bevel gear 314 mounted thereon that mates with bevel gear 306 on drive pin 302 when drive pin 302 is depressed. A left end 316 (as oriented in FIG. 17) of shaft 310 is squared to mate with the double squared hole in a translation actuator, such as actuator 54. Left end 316 of shaft 310 could also be formed to have a double squared hole to mate with a shaft, such as synchronization shaft 218 or 224, for "in-line" installation. A right end 318 of shaft 310 has a double squared hole to receive a squared end of a shaft, such as synchronization shaft 218 or synchronization shaft 224. Right end 318 of shaft 310 is affixed to cylindrical shaft 321 which is supported within housing 301 by a pair of bearings 322. Housing 301 further has attachment fittings 320, such as B-nut fittings, surrounding left end 316 and right end 318 of shaft 310.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a thrust reverser having at least first and second sides, each side having a thrust reverser actuation system, each thrust reverser actuation system having a plurality of actuators including a first actuator and a second actuator, the first and the second actuators being operable at different rates, and a synchronization system for synchronizing the plurality of actuators of that thrust reverser actuation system, a synchronization cross-feed system, comprising a coupling assembly coupled between the synchronization systems of the reverser actuation systems of the first and second sides of the thrust reverser.

2. The synchronization cross-feed system of claim 1, wherein the coupling assembly mechanically couples the synchronization systems of the thrust reverser actuation systems of the first and second sides of the thrust reverser.

3. The synchronization cross-feed system of claim 2 wherein the coupling assembly is coupled between the synchronization systems of the thrust reverser actuation systems by being coupled to at least one of the plurality of actuators of each thrust reverser actuation system.

4. The synchronization cross-feed system of claim 3 wherein the coupling assembly has first and second coupling assemblies, the first coupling assembly having a first shaft that is connected to one of the plurality of actuators of the thrust reverser actuation system of the first side of the thrust reverser and the second coupling assembly having a second shaft that is connected to one of the plurality of actuators of the thrust reverser actuation system of the second side of the thrust reverser.

5. The synchronization cross-feed system of claim 4, wherein the first and second coupling assemblies are removably coupled to each other.

6. The synchronization cross-feed system of claim 5, wherein the first coupling assembly has a telescopic coupling shaft coupled to the first shaft, the telescopic coupling shaft having engagement teeth at a proximal end proximate a bifurcation area between the first and second sides of the thrust reverser, the second coupling assembly having engagement teeth at a proximal end proximate the bifurcation area, the first and second coupling assemblies removably coupled to each other by the engagement teeth at the proximal end of the telescopic coupling shaft engaging the engagement teeth of the proximal end at the second coupling assembly wherein the engagement teeth at the proximal end of the telescopic shaft disengage from the engagement teeth at the proximal end of the second coupling assembly when the first and second sides of the thrust reverser are opened.

7. The synchronization cross-feed system of claim 6, wherein the first coupling assembly includes a spring that is compressed by the telescopic coupling shaft when the first and second sides of the thrust reverser are in a closed position, the compressed spring forcing the telescopic coupling shaft toward the proximal end of the second coupling assembly to urge the engagement teeth of the proximal end of the telescopic coupling shaft against the engagement teeth of the proximal end of the second coupling assembly.

8. The synchronization cross-feed system of claim 2 wherein the coupling assembly is coupled between the synchronization systems of the thrust reverser actuation systems by being coupled to a synchronization lock of each synchronization system.

9. The synchronization cross-feed system of claim 8 wherein the coupling assembly has first and second coupling assemblies, the first coupling assembly having a first shaft that is connected to the synchronization lock of the synchronization system of the first side of the thrust reverser and the second coupling assembly having a second shaft that is connected to the synchronization lock of the synchronization system of the second side of the thrust reverser.

10. The synchronization cross-feed system of claim 9, wherein the first and second coupling assemblies are removably coupled to each other.

11. The synchronization cross-feed system of claim 10, wherein the first coupling assembly has a telescopic coupling shaft coupled to the first shaft, the telescopic coupling shaft having engagement teeth at a proximal end proximate a bifurcation area between the first and second sides of the thrust reverser, the second coupling assembly coupled to the second shaft and having engagement teeth at a proximal end proximate the bifurcation area, the first and second coupling assemblies removably coupled to each other by the engagement teeth at the proximal end of the telescopic coupling shaft engaging the engagement teeth at the proximal end of the second coupling assembly wherein the engagement teeth at the proximal end of the telescopic shaft disengage from the engagement teeth at the proximal end of the second coupling assembly when the first and second sides of the thrust reverser are opened.

12. The synchronization cross-feed system of claim 11, wherein the first coupling assembly includes a spring that is compressed by the telescopic coupling shaft when the first and second sides of the thrust reverser are in a closed position, the compressed spring forcing the telescopic coupling shaft toward the proximal end of the second coupling assembly to urge the engagement teeth of the second end of the telescopic coupling shaft against the engagement teeth of the second end of the second coupling assembly.

13. In a thrust reverser system having first and second sides, each of the first and second sides having a thrust reverser actuation system, each thrust reverser actuation system having a plurality of actuators including a first actuator and a second actuator, the first and the second actuators being operable at different rates, and a synchronization system for synchronizing the plurality of actuators in that thrust reverser actuation system, a method of utilizing at least one anti-deployment mechanism of the thrust reverser actuation system of the first side as a redundant anti-deployment mechanism for the thrust reverser actuation system of the second side, comprising the step of linking the synchronization systems of the thrust reverser actuation systems.

14. The method of claim 13, wherein the step of linking the synchronization systems comprises mechanically linking the synchronization systems.

15. In a thrust reverser having at least first and second sides, each side having a thrust reverser actuation system, each thrust reverser actuation system having a plurality of actuators and a synchronization system for synchronizing the plurality of actuators of that thrust reverser actuation system, a synchronization cross-feed system, comprising a coupling assembly coupled between the synchronization systems of the reverser actuation systems of the first and second sides of the thrust reverser wherein the coupling assembly mechanically couples the synchronization systems of the thrust reverser actuation systems of the first and second sides of the thrust reverser;

wherein the coupling assembly is coupled between the synchronization systems of the thrust reverser actuation systems by being coupled to at least one of the plurality of actuators of each thrust reverser actuation system;

wherein the coupling assembly has first and second coupling assemblies, the first coupling assembly having a first shaft that is connected to one of the plurality of actuators of the thrust reverser actuation system of the first side of the thrust reverser and the second coupling assembly having a second shaft that is connected to one of the plurality of actuators of the thrust reverse actuation system of the second side of the thrust reverser wherein the first and second coupling assemblies are removably coupled to each other; and wherein the first coupling assembly has a telescopic coupling shaft coupled to the first shaft, the telescopic coupling shaft having engagement teeth at a proximal end proximate a bifurcation area between the first and second sides of the thrust reverser, the second coupling assembly having engagement teeth at a proximal end proximate the bifurcation area, the first and second coupling assemblies removably coupled to each other by the engagement teeth at the proximal end of the telescopic coupling shaft engaging the engagement teeth of the proximal end at the second coupling assembly wherein the engagement teeth at the proximal end of the telescopic shaft disengage from the engagement teeth at the proximal end of the second coupling assembly when the first and second sides of the thrust reverser are opened.

16. The synchronization cross-feed system of claim 15, wherein the first coupling assembly includes a spring that is compressed by the telescopic coupling shaft when the first and second sides of the thrust reverser are in a closed position, the compressed spring forcing the telescopic coupling shaft toward the proximal end of the second coupling assembly to urge the engagement teeth of the proximal end of the telescopic coupling shaft against the engagement teeth of the proximal end of the second coupling assembly.

17. In a thrust reverser having at least first and second sides, each side having a thrust reverser actuation system, each thrust reverser actuation system having a plurality of actuators and a synchronization system for synchronizing the plurality of actuators of that thrust reverser actuation system, a synchronization cross-feed system, comprising a coupling assembly coupled between the synchronization systems of the reverser actuation systems of the first and second sides of the thrust reverser wherein the coupling assembly mechanically couples the synchronization systems of the thrust reverser actuation systems of the first and second sides of the thrust reverser;

wherein the coupling assembly is coupled between the synchronization systems of the thrust reverser actuation systems by being coupled to a synchronization lock of each synchronization system;

wherein the coupling assembly has first and second coupling assemblies, the first coupling assembly having a first shaft that is connected to the synchronization lock of the synchronization system of the first side of the thrust reverser and the second coupling assembly having a second shaft that is connected to the synchronization lock of the synchronization system of the second side of the thrust reverser;

wherein the first and second coupling assemblies are removably coupled to each other; and wherein the first coupling assembly has a telescopic coupling shaft coupled to the first shaft, the telescopic coupling shaft having engagement teeth at a proximal end proximate a bifurcation area between the first and second sides of the thrust reverser, the second coupling assembly coupled to the second shaft and having engagement teeth at a proximal end proximate the bifurcation area, the first and second coupling assemblies removably coupled to each other by the engagement teeth at the proximal end of the telescopic coupling shaft engaging the engagement teeth at the proximal end of the second coupling assembly wherein the engagement teeth at the proximal end of the telescopic shaft disengage from the engagement teeth at the proximal end of the second coupling assembly when the first and second sides of the thrust reverser are opened.

18. The synchronization cross-feed system of claim 17, wherein the first coupling assembly includes a spring that is compressed by the telescopic coupling shaft when the first and second sides of the thrust reverser are in a closed position, the compressed spring forcing the telescopic coupling shaft toward the proximal end of the second coupling assembly to urge the engagement teeth of the second end of the telescopic coupling shaft against the engagement teeth of the second end of the second coupling assembly.

* * * * *